(12) United States Patent
Matsumoto et al.

(10) Patent No.: US 9,434,285 B2
(45) Date of Patent: Sep. 6, 2016

(54) FRAME STRUCTURE FOR SEAT BACK

(71) Applicant: Toray Industries, Inc., Tokyo (JP)

(72) Inventors: Satoshi Matsumoto, Nagoya (JP);
Yoshito Kuroda, Nagoya (JP); Koji Yamaguchi, Nagoya (JP)

(73) Assignee: Toray Industries, Inc. (JP)

( * ) Notice: Subject to any disclaimer, the term of this patent is extended or adjusted under 35 U.S.C. 154(b) by 36 days.

(21) Appl. No.: 14/361,109

(22) PCT Filed: Dec. 14, 2012

(86) PCT No.: PCT/JP2012/082457
§ 371 (c)(1),
(2) Date: May 28, 2014

(87) PCT Pub. No.: WO2013/099651
PCT Pub. Date: Jul. 4, 2013

(65) Prior Publication Data
US 2014/0300165 A1    Oct. 9, 2014

(30) Foreign Application Priority Data

Dec. 26, 2011    (JP) .................................. 2011-283265

(51) Int. Cl.
*B60R 22/26* (2006.01)
*B60N 2/68* (2006.01)
*B60N 2/20* (2006.01)
*B60R 22/34* (2006.01)

(52) U.S. Cl.
CPC ................. *B60N 2/688* (2013.01); *B60N 2/20* (2013.01); *B60N 2/68* (2013.01); *B60R 22/26* (2013.01); *B60R 22/34* (2013.01)

(58) Field of Classification Search
CPC ....................................................... B60N 2/688
USPC ........................................ 297/452.18, 354.1
See application file for complete search history.

(56) References Cited

U.S. PATENT DOCUMENTS

| 5,108,151 A * | 4/1992 | Peters ..................... B60N 2/686 297/452.18 |
| 5,362,132 A * | 11/1994 | Griswold ................ B60R 22/26 297/284.1 |
| 5,447,360 A * | 9/1995 | Hewko ................ B60N 2/4235 297/216.13 |
| 5,452,941 A * | 9/1995 | Halse .................. B60R 22/3405 297/452.2 |
| 5,516,195 A * | 5/1996 | Canteleux ............ B60N 2/2222 297/284.1 |
| 5,547,259 A * | 8/1996 | Fredrick ................ B60N 2/688 297/284.1 |

(Continued)

FOREIGN PATENT DOCUMENTS

| JP | 04-285506 | 10/1992 |
| JP | 05-168544 | 7/1993 |

(Continued)

*Primary Examiner* — Timothy J Brindley
(74) *Attorney, Agent, or Firm* — DLA Piper LLP (US)

(57) ABSTRACT

A frame structure to be provided in a seat back having a seatbelt retractor and a seatbelt guide at a top of a seat, wherein the frame structure is an integral structure including an oblique frame obliquely extending upwardly to a seatbelt guide installation section from a first support point located at an end side of a lower part of the seat back in a seat width direction, a vertical frame extending upwardly from a second support point located at another end side of the lower part of the seat back in the seat width direction and connects to the oblique frame at a top, and a transverse frame extending between a lower end of the oblique frame and a lower end of the vertical frame.

13 Claims, 5 Drawing Sheets

(56) References Cited

U.S. PATENT DOCUMENTS

| | | | | | |
|---|---|---|---|---|---|
| 5,658,048 | A * | 8/1997 | Nemoto | | B60N 2/4808 297/410 |
| 5,984,419 | A * | 11/1999 | Partington | | B60N 2/0232 297/216.13 |
| 5,988,748 | A * | 11/1999 | Morrison | | B60N 2/0232 248/157 |
| 6,490,834 | B1 * | 12/2002 | Dagher | | E04H 9/04 52/309.1 |
| 8,807,654 | B2 * | 8/2014 | Funk | | B29C 44/18 297/452.18 |
| 2005/0231019 | A1 * | 10/2005 | Gryp | | B60N 2/686 297/452.18 |
| 2008/0038569 | A1 * | 2/2008 | Evans | | B60N 2/68 428/474.9 |
| 2012/0193954 | A1 * | 8/2012 | Sakkinen | | B60N 2/4235 297/216.13 |
| 2012/0212029 | A1 * | 8/2012 | Wada | | B60N 2/24 297/479 |
| 2013/0241108 | A1 * | 9/2013 | Zynda | | B60N 2/686 264/279 |
| 2014/0097663 | A1 * | 4/2014 | Kroencke | | B60R 22/26 297/468 |
| 2014/0139004 | A1 * | 5/2014 | Matsumoto | | B29C 45/14786 297/452.18 |
| 2014/0232162 | A1 * | 8/2014 | Mitsuhashi | | B60N 2/688 297/452.18 |
| 2014/0306506 | A1 * | 10/2014 | Ruspa | | B60N 2/686 297/452.19 |
| 2014/0312677 | A1 * | 10/2014 | Bostrom | | B60N 2/688 297/464 |
| 2014/0327290 | A1 * | 11/2014 | Matsumoto | | B60R 22/26 297/452.18 |
| 2015/0232010 | A1 * | 8/2015 | Sato | | B60N 2/688 297/452.18 |

FOREIGN PATENT DOCUMENTS

| | | |
|---|---|---|
| JP | 06-305395 | 11/1994 |
| JP | 10-129416 | 5/1998 |
| JP | 2000-006696 | 1/2000 |
| JP | 2005-000194 | 1/2005 |
| JP | 2006-081676 | 3/2006 |
| JP | 2006-247066 | 9/2006 |
| JP | 2011-178300 | 9/2011 |

* cited by examiner

FRAME STRUCTURE FOR SEAT BACK

TECHNICAL FIELD

This disclosure relates to a frame structure for vehicle seat backs and specifically relates to a frame structure for seat backs, which has a seatbelt retractor and seatbelt guide and which has a high stiffness against the load applied toward a vehicle front and which is capable of achieving a lightweight structure.

BACKGROUND

A cushion of vehicle seat backs usually incorporates a frame structure for seat backs to provide the seat backs with sufficient strength and stiffness. There have been various measures to improve the seat backs in strength and stiffness.

JP 2006-81676-A discloses a frame structure improved in strength and stiffness by combining first and second metal frames with a hollow planar resin frame integrated with reinforcing ribs. JP 2005-194-A discloses a frame structure made of fiber reinforced resin provided with protrusive linear reinforcing parts which extend vertically at both sides of a plate-like framework main body. Such measures aim to improve the fixation strength of whole seat backs or to improve the strength and stiffness of a square frame structure for seat backs.

On the other hand, there are some frame structures for seat backs in which a seat frame is provided with a seatbelt retractor and a seatbelt guide (which may be called "seatbelt anchor"), independently from a vehicle frame. JP 10-129416-A discloses such a seat frame structure in which the seat back is improved in the attachment strength of the seatbelt retractor attached to the frame.

In a frame structure for seat backs in which a seatbelt retractor is attached to a seat frame, the seatbelt retractor and seatbelt guide are usually provided at the side of an end of the seat back in the vehicle width direction, and especially the seatbelt guide should be provided at the upper side of the frame. Because the seat belt is provided from the seatbelt retractor through the seatbelt guide to obliquely support a passenger, in case of a vehicle crash, the frame structure is subjected to a load applied forward or obliquely forward at the seatbelt guide installation section as the passenger moves forward according to the inertial law. Therefore, the stiffness of the frame structure for seat backs has to be enhanced enough to endure the bending and torsion caused by the load.

To improve the stiffness, JP 2006-81676-A and JP 2005-194-A disclose methods to enhance the strength and stiffness of a frame structure as a whole, and JP 2000-6696-A discloses a structure in which a deterrent bar is provided at the rear side of the seat back to achieve a high strength against a load applied toward the front side of the seat back. However, in such structures to improve the stiffness and strength, it might be difficult for the frame structure to be expected to be reduced in weight and otherwise might be expected to increase.

There are not many conventional suggestions to improve the stiffness of frame structures focusing on the load applied forward or obliquely forward through the seatbelt guide to the frame structures.

Accordingly, when focusing on the load applied forward or obliquely forward to the frame structure for seat backs, it could be helpful to provide a frame structure for seat backs capable of achieving the stiffness improvement of the frame structure effectively against the load while the frame structure is easily reduced in weight.

SUMMARY

We provide a frame structure to be provided in a seat back having a seatbelt retractor and a seatbelt guide at a top of a seat, wherein the frame structure is an integral structure including an oblique frame obliquely extending upwardly to a seatbelt guide installation section from a first support point located at an end side of a lower part of the seat back in a seat width direction, a vertical frame extending upwardly from a second support point located at another end side of the lower part of the seat back in the seat width direction and connects to the oblique frame at a top, and a transverse frame extending between a lower end of the oblique frame and a lower end of the vertical frame.

Figure 1:
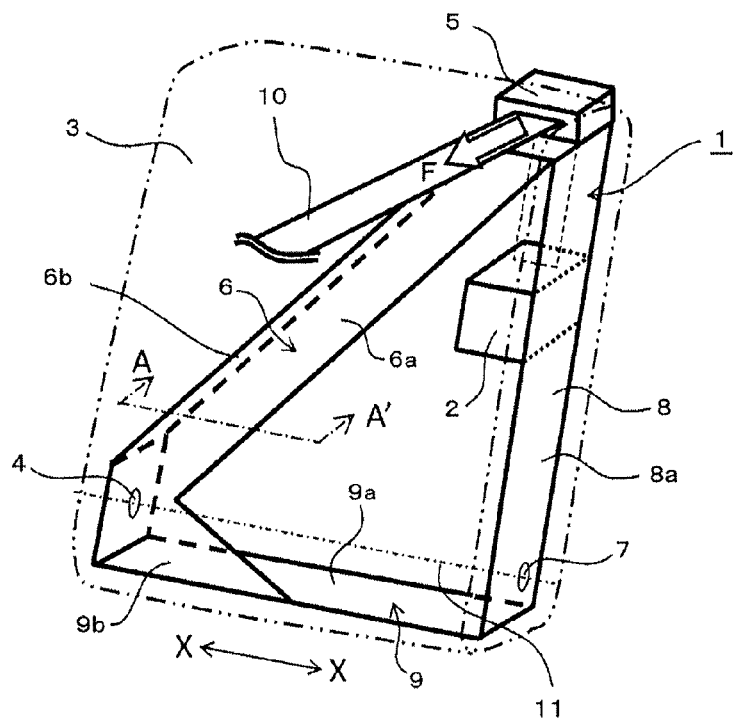
FIG. 1 is a schematic perspective view of a frame structure for seat backs according to an example.

EXPLANATION OF SYMBOLS 1, 21, 31, 71, 81, 91: frame structure for seat backs
2: seatbelt retractor
3: seat back
4: first support point
5: seatbelt guide
6, 22, 32, 72, 82, 92: oblique frame
7: second support point
8, 23, 33, 73, 83, 93: vertical frame
9, 24, 34, 74, 84, 94: transverse frame
10: seat belt
11: rotation axis
40, 50: core material
75, 76: reinforcing rib
85, 86: reinforcing frame
95, 96: fiber reinforced resin tape

DETAILED DESCRIPTION

We provide a frame structure for a seat back having a seatbelt retractor and a seatbelt guide at a seat top, wherein the frame structure is configured as an integral structure comprising an oblique frame that obliquely extends upward to a seatbelt guide installation section from a first support point located at an end side of a lower part of the seat back in a seat width direction, a vertical frame that extends upward from a second support point located at another end side of the lower part of the seat back in the seat width direction and connects to the oblique frame at a top, and a transverse frame that extends between a lower end of the oblique frame and a lower end of the vertical frame. The frame structure for seat backs is inside the seat back receiving the load applied to the seat back to contribute to the main stiffness of the seat back. Therefore, even if the seat back has a usually provided frame or the like set with cushions, such a frame or the like is different from our frame structures for seat backs. Namely, the scope of our frame structure does not depend on the presence or absence of the frame or the like.

In the frame structure for seat backs having the seatbelt retractor and seatbelt guide, because the seatbelt guide is located at the upper part of the frame structure, the frame structure is subjected to a load applied forward or obliquely forward from the seat belt to the seatbelt guide installation section as an impact of the vehicle crash would move a passenger forward according to inertial law. The frame structure has the oblique frame extending obliquely upward to the seatbelt guide installation section from the first support point located at the side of one end of the lower seat back part in the seat width direction and, therefore, the load applied forward or obliquely forward is efficiently borne by the frame structure so that the bending and torsion stiffness of the frame structure is effectively enhanced. Further, the frame structure has the oblique frame and the vertical frame extending upward from the second support point so that the bending stiffness of the frame structure is efficiently enhanced as a whole. Furthermore, the frame structure is configured as an integral structure having a schematically triangular front view where the lower end of the oblique frame connects to the lower end of the vertical frame through the transverse frame so that the torsion stiffness of the structure is greatly enhanced as a whole. Therefore, the load applied to the frame structure for seat backs, particularly the load applied from the seatbelt guide installation section, can be effectively received with a stiffness higher than that of conventional square frame structures. In addition, the frame structure can easily be reduced in weight as a whole because necessary frame members such as oblique frame, vertical frame and transverse frame are fewer than those of a square frame structure.

In our frame structures for seat backs, it is possible that the oblique frame is configured to comprise a plate section in a seat front side facing to a seat front-rear direction and another plate section in a lateral side facing to the seat width direction. Further, it is possible that the vertical frame is configured to have a plate section in the lateral side facing to the seat width direction. In such a structure the oblique frame has an L-shaped cross section and, therefore, the strength and stiffness of the oblique frame is enhanced in itself so that a high stiffness as well as lightness can be achieved with a simple shape together with the vertical frame.

It is possible that the transverse frame is configured to comprise a plate section in a bottom side facing to a seat vertical direction and another plate section in a front side facing to the seat front-rear direction and connects to the plate section in the seat front side of the oblique frame facing to the seat front-rear direction at the lower end of the oblique frame. In such a structure, the torsion stiffness of a whole frame structure can be greatly improved by enhancing the stiffness at the connection between the oblique frame and the transverse frame, as well as the stiffness of each of oblique frame and transverse frame in the integral frame structure.

Further, it is possible that the oblique frame is configured to have a U-shaped cross section. In such a structure, the bending stiffness of the oblique frame is enhanced more than the above-described structure having the L-shaped cross section so that the stiffness of the frame structure for seat backs is enhanced further.

Furthermore, it is possible that the oblique frame is configured to have a pipe-shaped cross section (including a box-shaped cross section). In such a structure, the torsion stiffness of the oblique frame is enhanced more than the above-described structure having the U-shaped cross section so that the stiffness of the frame structure for seat backs is further enhanced.

It is possible that the oblique frame is configured to have a core material in at least a part of a cross section. Of course, the core material can be provided over the whole oblique frame to enhance the stiffness of the frame structure. However, the core material may be provided partially over the upper or lower part of the oblique frame, in other words, at the seatbelt guide installation section or around the first support point so that the stiffness and strength of the frame structure is effectively enhanced to maintain the lightness. The core material may be a light material such as a foam material. In such a structure having the core material and a plate section (which means skin material on the core material) at least on one side and preferably on both sides of the core material, the stiffness of the frame member is substantially enhanced to maintain the lightness.

In the structure having each plate section, it is possible that the oblique frame and/or the transverse frame (the oblique frame or the transverse frame, or both of them) are configured to have a reinforcing rib. In such a structure in which each frame is provided with the reinforcing rib, the strength and stiffness of each frame is greatly structurally enhanced and, therefore, the stiffness of the frame structure for seat backs is greatly enhanced as a whole.

It is possible that the frame structure is configured to have a reinforcing frame extending between the oblique frame and the vertical frame. Further, it is possible that the frame structure is configured to have a reinforcing frame extending between the oblique frame and the transverse frame. Furthermore, it is possible that the frame structure is configured to have a reinforcing frame extending between the transverse frame and the vertical frame. Such reinforcing frames greatly structurally enhance the stiffness of a specific portion and a whole of the frame structure for seat backs. It is preferable that the reinforcing frame is provided to maintain the lightness of the frame structure as a whole.

To respond to demands of weight saving of the frame structure for seat backs, it is possible that at least a part of the frame structure is made of a resin. It is preferable that the frame structure is made of a resin as a whole. In our frame structures in which a few frame members comprising the oblique frame, the vertical frame and the transverse frame are integrated to enhance the stiffness efficiently, the stiffness can be kept sufficiently high even if the components are made of resin but metal. Such a usage of the resin can reduce the weight as a whole.

It is preferable that at least a part of the frame structure is made of a fiber reinforced resin. Employment of the fiber reinforced resin can easily achieve both desirable weight saving and enhancement of the stiffness for the frame structure for seat backs as a whole. Above all, it is preferable that at least a part of the oblique frame is made of the fiber reinforced resin since the oblique frame greatly contributes to the bending and torsion stiffness of the frame structure.

If the fiber reinforced resin is employed, it is possible that at least a part of one of the frames is made of the fiber reinforced resin and, alternatively, it is possible that at least a part of one of the frames is pasted with a fiber reinforced resin tape in which reinforcing fibers are unidirectionally-oriented. If each frame is pasted with the fiber reinforced resin tape so that the orientation of the reinforcing fibers is parallel to the extension direction of each frame, bending stiffness of each frame can be enhanced effectively. Otherwise, torsion stiffness of each frame can be enhanced by the angle between the orientation of the reinforcing fibers and the extension direction. The above-described options can be combined with each other in such a structure. Such option combinations can be selected depending on required specifications.

The reinforcing fibers are not restricted particularly, and reinforcing fibers such as carbon fiber, glass fiber and aramid fiber, may be combined. Matrix resins of the fiber reinforced resin are not particularly restricted and may be thermoplastic resin, thermosetting resin or a combination of them.

Our frame structures for seat backs are not restricted particularly as far as being a frame structure to be provided in a seat back having the seatbelt retractor and the seatbelt guide at the top of seat. For example, they are applicable to the one provided inside a tiltable seat back.

Thus, the frame structures for seat backs make it possible that the basic structure having the oblique frame to the seatbelt guide installation section at the top effectively improves the stiffness of the frame structure, particularly against the load applied forward or obliquely forward to the frame structure. The oblique frame, vertical frame and transverse frame are integrated into a single piece of the frame structure to enhance stiffness as a whole. There are only a few frame members required and resins or fiber reinforced resins are applicable to component materials to easily achieve the lightweight frame structure.

Hereinafter, examples will be explained with reference to the figures.

FIG. 1 shows an example of a frame structure for seat backs. The frame structure 1 for seat backs shown in FIG. 1 is configured as a frame structure to be installed inside a seat back 3 (or a cushion for seat backs) having a seatbelt retractor 2. With the seatbelt retractor 2, a seat belt 10 is taken up and wound off to support passengers through a seatbelt guide 5. The frame structure 1 for seat backs is configured as an integrated structure which has a schematic triangular shape in a front view and comprises an oblique frame 6, a vertical frame 8 and a transverse frame 9, the oblique frame 6 extending obliquely upward to the installation section for the seatbelt guide 5 from the first support point 4 located at an end of the lower part of the seat back 3 in width direction X-X, said vertical frame 8 extending upward to connect the oblique frame 6 at the top from the second support point 7 located at another end of the lower part of the seat back 3 in seat width direction X-X, the transverse frame 9 extending between the lower end of the oblique frame 6 and the lower end of the vertical frame 8 to connect both lower ends. A reclining mechanism (not shown) of the seat back 3 is attached to the first support point 4 so that the seat back 3 can be fixed as tiltable around a seat-back rotation axis 11 connecting the first support point 4 and the second support point 7. The frame structure 1 is supported by the second support point 7 to be allowed only to rotate around the rotation axis 11. At least a part and, preferably, all of the frame structure 1 for seat backs is made of fiber reinforced resin such as carbon fiber reinforced resin, and is integrated into a single piece.

Figure 4:
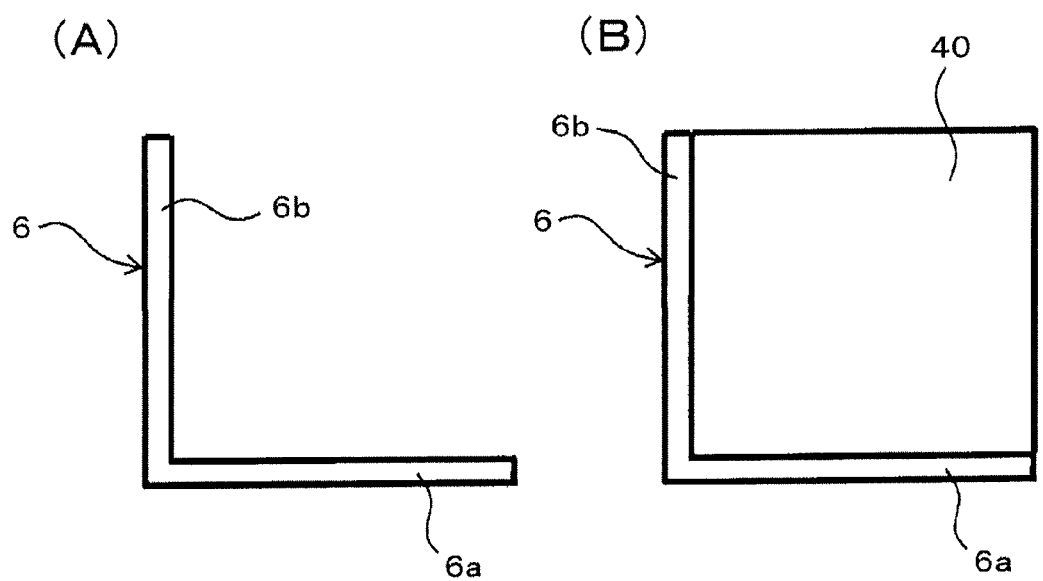
In FIG. 4, cross-sectional view (A) shows an oblique frame viewed along line A-A' in FIG. 1 while cross-sectional view (B) shows a modified oblique frame thereof.

Also shown in FIG. 4(A) for this example, the oblique frame 6 is configured as a structure having an L-shaped cross section consisting of a plate section 6a which is in the seat front side facing to the seat front-rear direction and a plate section 6b which is in the lateral side facing to the seat width direction. The vertical frame 8 consists of a plate section 8a in the lateral side facing to the seat width direction. The transverse frame 9 is configured as a structure consisting of a plate section 9a which is in the bottom side facing to the seat vertical direction and a plate section 9b which is in the seat front side facing to the seat front-rear direction, the plate section 9b partially connecting to the plate section 9a and connecting to the plate section 6a in the seat front side facing to the seat front-rear direction at the lower side of the oblique frame 6. Thus, the plate section 9b enhances the stiffness at the connection between the oblique frame 6 and the transverse frame 9 so that the stiffness around the first support point 4 provided with a reclining mechanism is further enhanced. As shown in FIG. 4(B), the oblique frame 6 may be configured as a light and stiff structure to have a core material 40 made of light material such as foam material in the cross section. The core material 40 may be provided over whole oblique frame 6, and alternatively provided partially. The stiffness and strength can be effectively enhanced if the core material 40 is provided partially around the first support point 4 at the lower end of the oblique frame 6. Alternatively, the attachment stiffness and strength can be effectively enhanced at the seatbelt guide installation section if the core material 40 is provided around the seatbelt guide 5 installation section at the upper end of the oblique frame 6.

In FIG. 1, if the frame structure 1 is subjected to load F applied forward or obliquely forward at the installation section for the seatbelt guide 5, the frame structure 1 might deform as distorting and bending to the vehicle front side because the rotation around the rotation axis 11 is restricted at the first support point 4 by the reclining mechanism. The oblique frame 6 extending obliquely from the first support point 4 toward the upper seatbelt guide 5 can efficiently receive load F and, therefore, the stiffness of the frame structure 1 is enhanced effectively. Further, if the frame structure 1 is configured as an integral structure consisting of the oblique frame 6, the vertical frame 8 and the transverse frame 9, the stiffness of the frame structure 1 as a whole can be efficiently enhanced with a small number of frame members to achieve lightweight frame structure 1. Particularly, if whole frame structure 1 is made of fiber reinforced resin, the high strength and high stiffness of whole frame structure 1 can be maintained while lightweight frame structure 1 is achieved as a whole.

Figure 2:
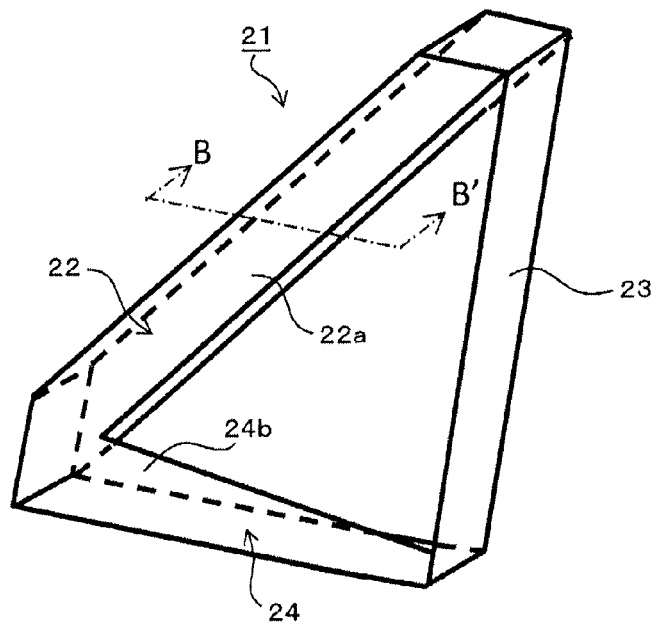
FIG. 2 is a schematic perspective view of a frame structure for seat backs according to another example.
Figure 5:
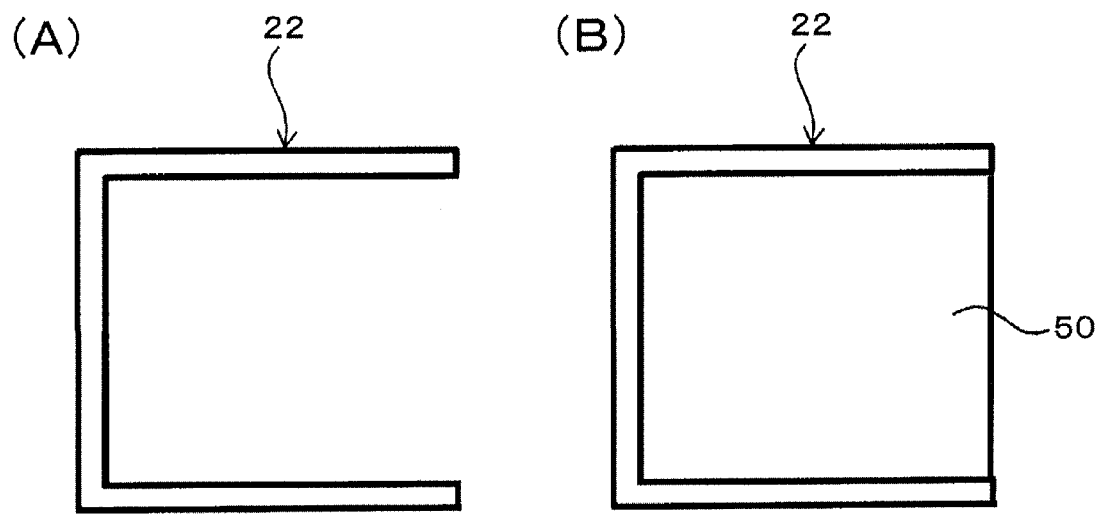
In FIG. 5, cross-sectional view (A) shows an oblique frame viewed along line B-B' in FIG. 2 while cross-sectional view (B) shows a modified oblique frame thereof.

Such a frame structure for seat backs can be configured as various examples as follows. In FIG. 2, an oblique frame 22 is configured to have a U-shaped cross section to structurally enhance the strength and stiffness of the oblique frame 22 in itself as shown in FIG. 5(A), in addition to the same structure as shown in FIG. 1 in which a frame structure 21 for seat backs is configured as an integral structure consisting of an oblique frame 22, a vertical frame 23 and a transverse frame 24. The transverse frame 24 is configured as a structure in which a plate section 24b in the front side facing to the seat front-rear direction connects to a plate section 22a at the lower end of the oblique frame 22 and connects to the lower end of the vertical frame 23 so that the frame structure is improved in integrity to enhance the stiffness as a whole. The oblique frame 22 may be configured as a structure having a core material 50 made of light material such as foam material in the U-shaped cross section as shown in FIG. 5(B) so that the stiffness is further enhanced as maintaining the lightweight property. The core material 50 may be provided over whole oblique frame 22 or, alternatively, partially provided.

Figure 3:
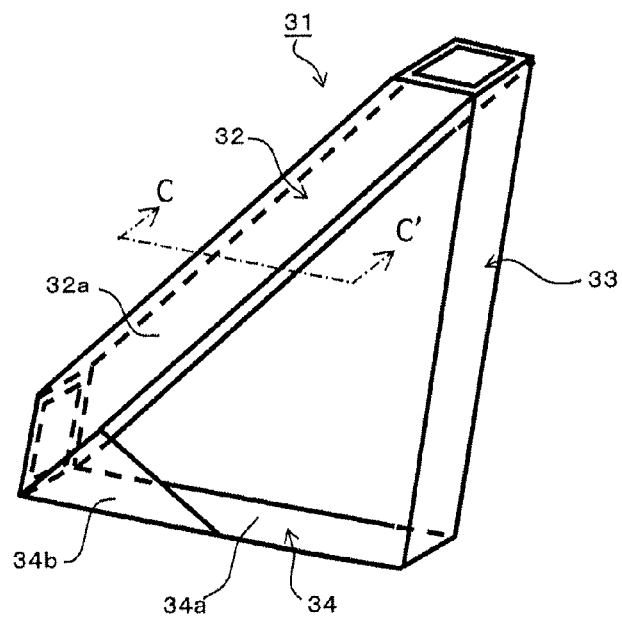
FIG. 3 is a schematic perspective view of a frame structure for seat backs according to yet another example.
Figure 6:
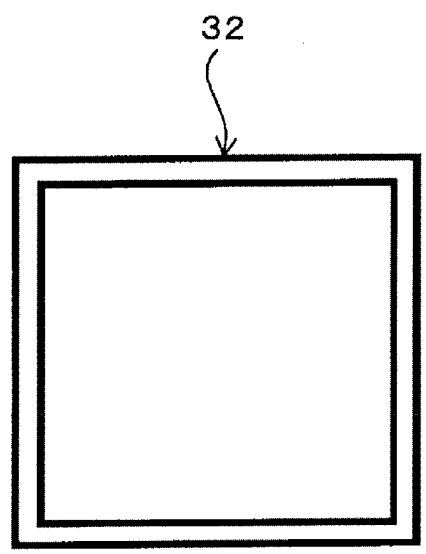
FIG. 6 is a cross-sectional view of an oblique frame viewed along line C-C' in FIG. 3.

In FIG. 3, an oblique frame 32 is configured to have a pipe-shaped cross section (shown as a box-shaped cross section in the Fig.) to structurally enhance the strength and stiffness of the oblique frame 32 in itself as shown in FIG. 6, in addition to the same structure as shown in FIG. 1 in which the frame structure 31 for seat backs is configured as an integral structure consisting of an oblique frame 32, a vertical frame 33 and a transverse frame 34. The transverse frame 34 consists of plate section 34a which is in the bottom side facing to the seat vertical direction and plate section 34b which is in the seat front side facing to the seat front-rear direction, wherein said plate section 34b partially connects to the plate section 34a and connects to lower side of the plate section 32a so that the stiffness of the oblique frame 32 and the transverse frame 34 as well as the stiffness of the connection therebetween are enhanced in the integral frame structure. Though not shown in any Fig, the oblique frame 32 may be configured as a light and stiff structure to have a core material made of light material such as foam material partially or wholly in the pipe-shaped frame.

Figure 7:
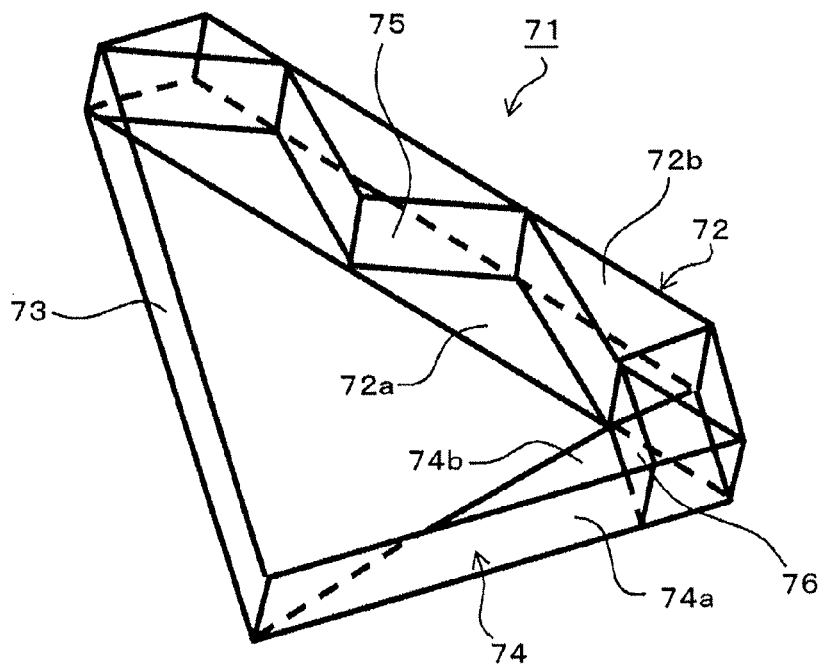
FIG. 7 is a schematic perspective view of a frame structure for seat backs according to yet another example, as viewed from the back face in FIG. 1.

FIG. 7 is a schematic perspective view as viewed from the back face in FIG. 1. In FIG. 7, an oblique frame 72 is integrated with reinforcing ribs 75 zigzag extending between plate sections 72a and 72b while a transverse frame 74 is integrated with reinforcing rib 76 connecting plate sections 74a and 74b, in addition to the same structure as shown in FIG. 1 in which a frame structure 71 for seat backs is configured as an integral structure consisting of an oblique frame 72, a vertical frame 73 and a transverse frame 74. Thus, the reinforcing ribs 75 and 76 are integrally provided so that the stiffness of the oblique frame 72 and the transverse frame 74 as well as the stiffness such as torsion stiffness of whole frame structure 71 for seat backs are greatly enhanced.

Figure 8:
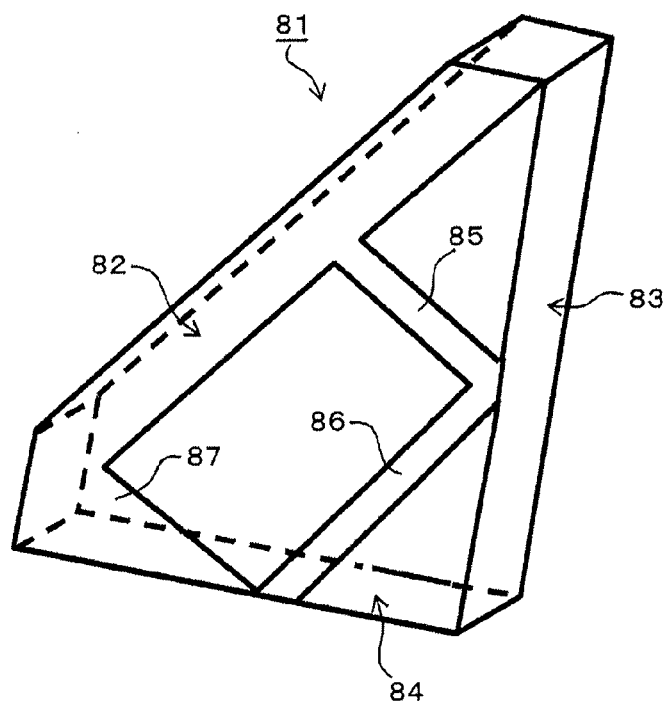
FIG. 8 is a schematic perspective view of a frame structure for seat backs according to yet another example.

In FIG. 8, a reinforcing frame 85 is provided as extending between an oblique frame 82 and a vertical frame 83 while a reinforcing frame 86 is provided as extending between a vertical frame 83 and a transverse frame 84, in addition to the same structure as shown in FIG. 1 in which frame structure 81 for seat backs is configured as an integral structure consisting of an oblique frame 82, a vertical frame 83 and a transverse frame 84. A front plate section 87 of the transverse frame 84 extending between the oblique frame 82 and the transverse frame 84 functions also as a reinforcing frame extending between both the frames. Thus, the reinforcing frames may be provided so that the oblique frame 82 is reinforced and the stiffness of the frame structure 81 is enhanced as a whole.

Figure 9:
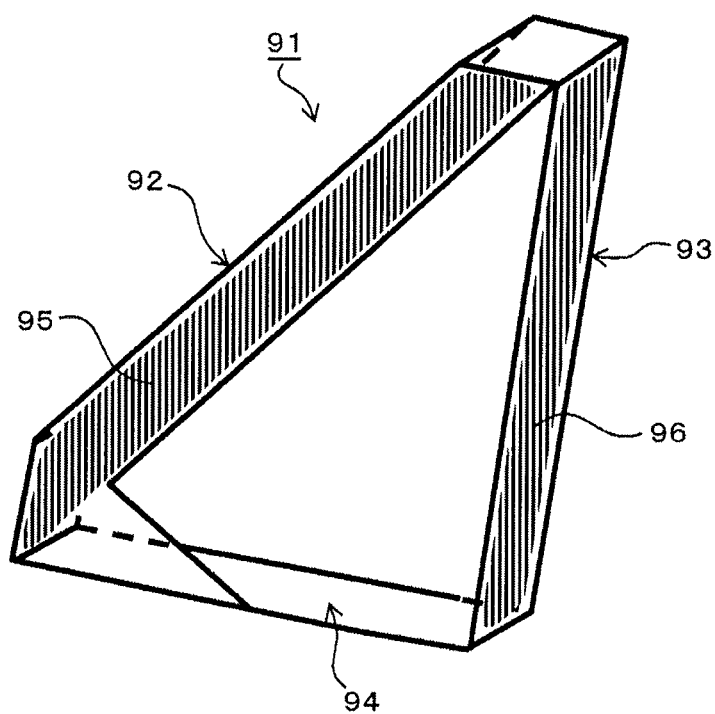
FIG. 9 is a schematic perspective view of a frame structure for seat backs according to yet another example.

In FIG. 9, at least a part of a frame structure 91, which specifically consists of an oblique frame 92 and a vertical frame 93 in this example, is pasted with fiber reinforced resin tapes 95 and 96 with unidirectionally-oriented reinforcing fibers, in addition to the same structure as shown in FIG. 1 in which a frame structure 91 for seat backs is configured as an integral structure consisting of an oblique frame 92, a vertical frame 93 and a transverse frame 94. With the pasted fiber reinforced resin tapes 95 and 96, the structure is easily efficiently reinforced from the outside. Otherwise than the depicted structure, even the transverse frame 94 may be pasted with such a fiber reinforced resin tape.

Thus, we provide various examples having a structure of an oblique frame or a transverse frame, a formation of reinforcing ribs or reinforcing frames and a reinforcing formation of each section.

INDUSTRIAL APPLICATIONS

Our frame structures are applicable to every frame structure for seat backs which has a seatbelt guide at the upper side.

The invention claimed is:

1. A frame structure to be provided in a seat back having a seatbelt retractor and a seatbelt guide at a top of a seat, wherein the frame structure is an integral structure comprising:
    an oblique frame obliquely extending upwardly to a seatbelt guide installation section from a first support point located at an end side of a lower part of the seat back in a seat width direction, and having a core member made of a foam material in at least a part of a cross section thereof, and a U-shaped cross section,
    a vertical frame extending upwardly from a second support point located at another end side of the lower part of the seat back in the seat width direction and connects to the oblique frame at a top,
    a transverse frame extending between a lower end of the oblique frame and a lower end of the vertical frame.

2. The frame structure according to claim 1, wherein the oblique frame comprises a plate section in a seat front side facing to a seat front-rear direction and another plate section in a lateral side facing to the seat width direction.

3. The frame structure according to claim 1, wherein the vertical frame has a plate section in the lateral side facing to the seat width direction.

4. The frame structure according to claim 2, wherein the transverse frame comprises a plate section in a bottom side facing to a seat vertical direction and another plate section in a front side facing to the seat front-rear direction and connects to the plate section in the oblique frame facing to the seat front-rear direction at the lower end of the oblique frame.

5. The frame structure according to claim 1, wherein the oblique frame and/or the transverse frame have a reinforcing rib.

6. The frame structure according to claim 1, wherein the frame structure has a reinforcing frame extending between the oblique frame and the vertical frame.

7. The frame structure according to claim 1, wherein the frame structure has a reinforcing frame extending between the oblique frame and the transverse frame.

8. The frame structure according to claim 1, wherein the frame structure has a reinforcing frame extending between the transverse frame and the vertical frame.

9. The frame structure according to claim 1, wherein at least a part of the frame structure is made of a resin.

10. The frame structure according to claim 1, wherein at least a part of the frame structure is made of a fiber reinforced resin.

11. The frame structure according to claim 10, wherein at least a part of the oblique frame is made of the fiber reinforced resin.

12. The frame structure according to claim 1, wherein at least a part of the frame structure is pasted with a fiber reinforced resin tape in which reinforcing fibers are unidirectionally-oriented.

13. The frame structure according to claim 1, wherein the frame structure is provided inside a tiltable seat back.

* * * * *